3,018,265
Patented Jan. 23, 1962

3,018,265
METHOD OF FORMING A RESIN FROM A NITROGEN COMPOUND, FORMALDEHYDE, AN ALCOHOL AND AN UNSATURATED MONOCARBOXYLIC ACID, AND PRODUCT THEREOF
Klaus Tessmar, Darmstadt, Germany, assignor to Röhm & Haas G.m.b.H., Darmstadt, Germany
No Drawing. Filed Dec. 17, 1956, Ser. No. 628,478
Claims priority, application Germany Dec. 16, 1955
9 Claims. (Cl. 260—45.2)

This invention relates to modified aminomethylol ether precondensates, to resins prepared therefrom and to methods for their preparation.

In accordance with the invention, precondensates of formaldehyde with an organic nitrogen compound selected from the group consisting of amides and amidines such as urea, urea derivatives and amino-triazines are prepared by effecting the condensation of starting materials in the presence of an alcohol and an unsaturated, polymerizable carboxylic acid. The precondensates thus obtained are susceptible to copolymerization with ethylenically unsaturated monomers or to reaction therewith to form an adduct capable of polymerization and useful in the production of tough, elastic and weather-resistant coatings.

The amides and amidines that are useful in the method of this invention include, in addition to urea and melamine, such urea derivatives and amino-triazines or cyanur amides as thiourea, substituted ureas, biuret, guanidine, cyanamide, dicyanamide, hydantoin, melam, melem, ammeline, ammelide and mixtures thereof. The basic requirement for an operable organic nitrogen compound is that it must contain at least one primary or secondary amido or amidino group.

The alcohol initially employed in forming the precondensate is a low molecular weight primary or secondary alcohol selected from the group consisting of the lower alkyl monohydric alcohols, lower alkylene glycols and lower alkoxy alkanols. As is known in the art, primary and secondary alcohols are alcohols in which the hydroxyl-bearing carbon atoms are substituted by hyrogen. Methanol, ethanol, n-propanol, isopropanol, butanol, ethylene glycol and 4-methoxy butanol are typical among those suitable in the method of the invention. These alcohols have up to 5 carbon atoms.

The unsaturated, polymerizable carboxylic acid present during the formation of the precondensate is preferably an acid selected from the group consisting of acrylic and butenic acids, e.g., acrylic acid $CH_2$:CHCOOH, methacrylic acid $CH_2$:C($CH_3$)COOH, crotonic acid

$CH_3CH$:CHCOOH or a mixture thereof. As is known in the art, these acids are aliphatic monocarboxylic acids.

The condensation of the organic nitrogen compound with formaldehyde is, as customary, effected with such relative proportions that there is at least one formaldehyde available for each amido or amidino group. There is no advantage, however, in employing an excess of more than about three mols of formaldehyde per amido or amidino group. The preferred range of proportion, therefore, is from one to about three mols of formaldehyde per amido or amidino group. Thus, for example, formaldehyde is most advantageous used in proportions of two to about six mols per mol of urea and from three to about nine mols per mol of melamine.

The amount of alcohol used in the preparation of the precondensate may be varied widely depending upon the particular results desired. It may be equivalent to the amount of formaldehyde available for reaction so that a complete etherification of the primary alcohol group occurs by stoichiometric reaction. It may also, however, be smaller so that only a partial etherification of the methylol groups takes place. On the other hand, the alcohol can be used in considerable excess so that the methylol ether formed will remain dissolved in the excess alcohol.

The proportion of polymerizable carboxylic acid should be chosen, particularly if it is desired to produce resins of superior water resistance, so that the acid will constitute between about 2 and 20% by weight of the precondensate.

In preparing the precondensate in accordance with the invention, the amide or amidine is preferably dissolved in the alcohol component together with the aqueous formaldehyde and the acid. The solution is then heated until the main portion of the formaldehyde has reacted, whereupon the mixture is heated to the boiling point under reflux, preferably at subatmospheric pressure, and water is removed. When the alcohol employed is one that is miscible with water, the separation of water can be expedited by the addition to the reaction mixture of an inert solvent such as petroleum ether or benzene that is immiscible with water. It is advantageous, in conducting the condensation, to avoid polymerizing the carboxylic acid or at least to not allow the acid to polymerize to an extent sufficient to result in a precipitation of the polymer. This is readily accomplished by known means such as the use of lower temperature (e.g., at subatmospheric pressure), cutting short the time of reaction, the use of stabilizers, or the exclusion of oxygen.

It is also within the scope of the invention to form a precondensate with alcohols of higher molecular weight. If this is desired, it is advantageous to conduct the condensation first with a lower molecular weight alcohol (as hereinbefore defined), such as methanol and then to subject the precondensate thus obtained to an ether rearrangement, completely or at least in part, with a higher alcohol, e.g., cetyl alcohol having 16 carbon atoms, as well known in the art.

The resin precondensates obtained by reaction of an amide or amidine, or both, and formaldehyde in the presence of an alcohol and a polymerizable acid may advantageously be reacted or copolymerized with one or more ethylenically unsaturated monomers such as styrene and the alkyl esters of acrylic and butenic acids. Typical of the latter monomers that are suitable for this purpose are the methyl, ethyl, propyl and butyl esters of acrylic, methacrylic and crotonic acids.

The relative proportions of precondensate and monomer may vary considerably depending upon the characteristics desired in the final product. Advantageously, the proportions are maintained at between about 1:3 and 3:1 by weight. The reaction or copolymerization is advantageously conducted in the presence of a catalyst such as benzoyl peroxide, although not necessarily so, and in the presence of a diluent such as for example a mixture of benzine and butyl alcohol, ethyl acetate, toluene, or the like. Polymerization is carried out by heating to an elevated temperature of the order of about 90° C.

When the precondensates are copolymerized with a monomer, they form homogeneous products that are useful as raw materials for the preparation of varnishes and the like. They may also be used in emulsified form upon addition to a suitable dispersing medium or the polymerization can be conducted in such a way that the modified amino-methylol ether is obtained in the form of an emulsion. Films that are produced from such emulsions are characterized, particularly if they are annealed by heating to a temperature of the order of 120 to 160° C., by an extraordinarily high resistance to water. These films are also flexible and, since they do not require the addition of oil alkyds as plasticizers, are free from yellowing when used for such applications as white pigmented resin enamels. In addition, coatings produced from these resins are tough, and fast to light.

It is also within the scope of the invention to dissolve the modified amino-methylol ether precondensate in a polymerizable monomer together with a suitable polymer, e.g., the polymer corresponding to the monomer in which it is dissolved, and then copolymerizing the homogeneous mixture.

The advantages and utility of the invention will become further apparent from the following examples included to illustrate the best modes now contemplated of carrying out the invention.

EXAMPLE 1

420 g. urea
2250 g. of a 40% formaldehyde solution
2000 g. butyl alcohol
63 g. methacrylic acid were condensed under reflux for two hours. Thereafter, water was removed with butyl alcohol under a vacuum at about 60° C. in the course of four hours, the amount of butyl alcohol distilled off being such that the solids content of the solution became 70%. This precondensate was then modified in the following ways:

Part A 860 g. of the precondensate
400 g. butyl ester of methacrylic acid
1 g. benzoyl peroxide were dissolved in 335 g. benzine and 75 g. of butyl alcohol and polymerized at 90° C. in the course of six hours while stirring. It was found that the polymer formed clear films having very good water resistance upon being subjected to a temperature of 120 to 160° C.

Part B 860 g. of the precondensate
300 g. butyl ester of methacrylic acid
100 g. butyl ester of acrylic acid
1 g. benzoyl peroxide were dissolved in 335 g. benzine and 75 g. butyl alcohol and polymerized at 90° C. in the course of six hours while stirring. A polymer solution was obtained which formed a hard, elastic film after annealing at 140° C.

Part C 860 g. of the precondensate
150 g. butyl ester of methacrylic acid
150 g. methyl methacrylate
1 g. benzoyl peroxide were dissolved in 410 g. ethyl acetate and polymerized at 90° C. in the course of six hours with stirring.

Part D 860 g. of the precondensate
150 g. methyl methacrylate
150 g. styrene
1 g. benzoyl peroxide were dissolved in 500 g. toluene and polymerized at 90° C. in the course of ten hours while stirring.

Part E 100 g. of the precondensate and 100 g. butyl ester of methacrylic acid were mixed. The butyl alcohol used as solvent in the preparation of the condensate and a portion of the monomer were then distilled off in a column maintained at a vacuum of approximately 30 mm. Hg. The resulting solution of a methacrylated urea-methylol-butyl ether in methacrylic acid-butyl ester can be further utilized in known manner for bulk, bead- or emulsion polymerization. The polymer may, for example, be utilized for pressure molding.

Part F 100 g. of the precondensate and 100 g. cetyl alcohol were heated to 140° C. while stirring. Butyl alcohol was distilled off under a vacuum of 20 to 30 mm. and thereupon excess cetyl alcohol was distilled off at 0.1 mm. The product obtained was a non-hardenable wax soluble in benzine, benzene, alcohols, esters and ketones.

EXAMPLE 2

30 g. urea
194 g. of a 40% formaldehyde solution
200 g. isopropyl alcohol
4.5 g. methacrylic acid
300 g. of a petroleum ether having a boiling point range of 40 to 75° C., were heated to boiling under a reflux while stirring well. The lower layer of the reflux was separated. Thereupon distillation was continued until excess isopropyl alcohol was distilled off and the content of petroleum ether was 60 to 70%.

100 g. of this precondensate and 100 g. of methyl methacrylate were mixed. The alcohol and a part of the monomer were then distilled off in a column under a weak vacuum (about 100 mm.). A solution of methacrylated urea-methylol-isopropyl ether in methyl methacrylate was obtained. This could be polymerized, if desired with the addition of other monomers, by bulk-, bead- or emulsion methods.

EXAMPLE 3

126 g. melamine
650 g. of a 40% formaldehyde solution
650 g. butyl alcohol
35 g. methacrylic acid where condensed under reflux in the course of one hour. Thereupon the water was removed and a portion of the butyl alcohol was distilled off under a vacuum at approximately 60° C. in the course of three to four hours until a 70% solution was obtained. The precondensate solution can be further utilized as described in the previous examples.

EXAMPLE 4

60 g. urea
350 g. of a 40% formaldehyde solution
300 g. butyl alcohol
20 g. ethylene glycol
15 g. methacrylic acid were heated for two hours under reflux and thereupon heated for an additional two hours for removal of the water and of an amount of butyl alcohol sufficient to result in a solution having a solids content of approximately 70%.

EXAMPLE 5

60 g. urea
60 g. melamine
800 g. of a 30% formaldehyde solution
670 g. butyl alcohol
12.6 g. methacrylic acid were condensed and converted into a 70% solids solution as described in Example 1. This precondensate solution can be further utilized as described in the preceding examples.

EXAMPLE 6

100 g. of the 70% carbamido methylol ether solution in butyl alcohol, prepared in the manner described in Example 1, were dissolved in 300 g. of the butyl ester of methacrylic acid, emulsified in 600 g. water containing one gram ammonium persulfate and an emulsifying agent and subjected for three hours to polymerization under an atmosphere of nitrogen. A milk-white polymer dispersion of medium viscosity was obtained with a solids content of 38%. The dispersion was capable of forming a film at room temperature. The resulting film, upon being annealed at approximately 140° C., had improved resistance to the action of solvents. It was flexible, turbid and possessed very good resistance to water.

It is to be expected that numerous modifications will readily become apparent to those skilled in the art upon reading this description. All such modifications are intended to be included within the scope of the invention as defined in the appended claims.

I claim:

1. The method which comprises condensing at least one nitrogen compound selected from the group consisting of urea, melamine, thiourea, biuret, guanidine, cyanamide, dicyanamide, hydantoin, melam, melem, ammeline, and ammelide with from 1 to 3 mols of formaldehyde per each amido and amidino group in said compound in the presence of an alcohol having up to 5 carbon atoms and selected from the group consisting of lower alkyl primary and secondary monohydric alcohols, lower alkylene glycols, and lower alkoxy alkanols, and between 2 and 20 percent by weight, based on the weight of condensation product, of an unsaturated, polymerizable aliphatic monocarboxylic acid.

2. An amino-methylol ether condensation product prepared according to claim 1.

3. The method according to claim 1 wherein said nitrogen compound is urea.

4. The method according to claim 1 wherein said nitrogen compound is melamine.

5. The method according to claim 1 wherein said acid is selected from the group consisting of acrylic and butenic acids.

6. The method according to claim 1 wherein said acid is methacrylic acid.

7. The method which comprises condensing a mixture of urea and melamine with from 1 to 3 mols of formaldehyde per each amido and amidino group in said mixture in the presence of an alcohol having up to 5 carbon atoms and selected from the group consisting of lower alkyl primary and secondary monohydric alcohols, lower alkylene glycols, and lower alkoxy alkanols, and between 2 and 20 percent by weight, based on the weight of condensation product, of methacrylic acid.

8. The method which comprises copolymerizing (1) a condensation product prepared by condensing at least one nitrogen compound selected from the group consisting of urea, melamine, thiourea, biuret, guanidine, cyanamide, dicyanamide, hydantoin, melam, melem, ammeline, and ammelide with from 1 to 3 mols of formaldehyde per each amido and amidino group in said compound in the presence of an alcohol having up to 5 carbon atoms and selected from the group consisting of lower alkyl primary and secondary monohydric alcohols, lower alkylene glycols, and lower alkoxy alkanols, and between 2 and 20 percent by weight, based on the weight of condensation product, of an unsaturated, polymerizable aliphatic monocarboxylic acid, with (2) an ethylenically unsaturated monomer selected from the group consisting of styrene and alkyl esters of acrylic and butenic acids.

9. A resin prepared according to claim 8.

References Cited in the file of this patent

UNITED STATES PATENTS

| | | |
|---|---|---|
| 2,374,812 | Gutkin | May 1, 1945 |
| 2,496,097 | Kropa | Jan. 31, 1950 |
| 2,514,505 | Morton | July 11, 1950 |
| 2,640,046 | Thurston | May 26, 1953 |
| 2,689,228 | Thomas | Sept. 14, 1954 |
| 2,822,347 | Wohnsiedler | Feb. 4, 1958 |

OTHER REFERENCES

Hackh's Chemical Dictionary, 2nd Edition (1937), page 47.